(12) United States Patent
Chen (10) Patent No.: US 11,184,539 B2
(45) Date of Patent: Nov. 23, 2021

(54) INTELLIGENT DUAL-LENS PHOTOGRAPHING DEVICE AND PHOTOGRAPHING METHOD THEREFOR

(71) Applicant: Jiazhi Chen, Suzhou (CN)

(72) Inventor: Jiazhi Chen, Suzhou (CN)

( * ) Notice: Subject to any disclaimer, the term of this patent is extended or adjusted under 35 U.S.C. 154(b) by 0 days.

(21) Appl. No.: 16/762,650

(22) PCT Filed: Nov. 10, 2017

(86) PCT No.: PCT/CN2017/110462
§ 371 (c)(1),
(2) Date: May 8, 2020

(87) PCT Pub. No.: WO2019/090699
PCT Pub. Date: May 16, 2019

(65) Prior Publication Data
US 2020/0275026 A1    Aug. 27, 2020

(51) Int. Cl.
*H04N 5/232* (2006.01)
(52) U.S. Cl.
CPC ..... *H04N 5/23248* (2013.01); *H04N 5/23227* (2018.08); *H04N 5/23245* (2013.01); *H04N 5/23293* (2013.01)
(58) Field of Classification Search
CPC ........... H04N 5/23248; H04N 5/23227; H04N 5/23245; H04N 5/23293
See application file for complete search history.

(56) References Cited

U.S. PATENT DOCUMENTS

| | | |
|---|---|---|
| 2011/0285845 A1 | 11/2011 | Bedros et al. |
| 2012/0300051 A1 | 11/2012 | Daigo et al. |
| 2014/0347439 A1* | 11/2014 | Jia ............ H04N 5/23238 348/36 |

FOREIGN PATENT DOCUMENTS

| | | |
|---|---|---|
| CN | 1658670 A | 8/2005 |
| CN | 101068342 A | 11/2007 |

(Continued)

OTHER PUBLICATIONS

International Search Report for PCT/CN2017/110462 dated Mar. 28, 2018.

*Primary Examiner* — Twyler L Haskins
*Assistant Examiner* — Fayez A Bhuiyan
(74) *Attorney, Agent, or Firm* — Schmeiser, Olsen & Watts, LLP (57) ABSTRACT

An intelligent dual-lens photographing device and a photographing method is provided. The photographing device includes a first photographing module, a second photographing module, a shutter, a first driving mechanism, a second driving mechanism, a third driving mechanism, and a controller. The shutter is connected to the second photographing module. The first photographing module and the second photographing module are driven by the first driving mechanism to horizontally rotate synchronously. The first photographing module and the second photographing module are driven by the second driving mechanism to rotate around horizontal axis synchronously. The second photographing module is driven by the third driving mechanism to horizontally move and/or pitching independently. The intelligent dual-lens photographing device uses a wide-angle photographing module to synchronize and track a moving photographing target, and then uses a zoom long-focus photographing module to perform waiting photographing on the photographing target, so as to improve the photographing quality.

13 Claims, 6 Drawing Sheets

(56) References Cited

FOREIGN PATENT DOCUMENTS

| | | | |
|---|---|---|---|
| CN | 104125433 | A | 10/2014 |
| CN | 104660998 | A | 5/2015 |
| CN | 105847662 | A | 8/2016 |
| CN | 106488127 | A | 3/2017 |
| GB | 2480521 | A8 | 11/2011 |
| JP | 2013013050 | A | 1/2013 |

* cited by examiner

INTELLIGENT DUAL-LENS PHOTOGRAPHING DEVICE AND PHOTOGRAPHING METHOD THEREFOR

CROSS-REFERENCE TO RELATED APPLICATIONS

This application claims priority to PCT Application No. PCT/CN2017/110462, having a filing date of Nov. 10, 2017, the entire contents of which are hereby incorporated by reference.

FIELD OF TECHNOLOGY

The following relates to the image acquisition field, in particular to an intelligent dual-lens photographing device and a photographing method therefor.

BACKGROUND

The types of magnifiers currently on the market comprise optical devices which are handheld, desktop non-intelligent mobile, fixed-focus, fixed-magnification. The photographing device is usually a single-lens device, which realizes the image acquisition function.

The existing technology has at least the following defects:
a. The single-lens capture rate for moving objects is low or the pixels and qualities of image acquisition are low;
b. It is difficult to image clearly for objects whose flight speed exceeds a certain threshold.

SUMMARY

An aspect relates to an intelligent dual-lens photographing device and a photographing method.

In one aspect, the present disclosure provides an intelligent dual-lens photographing device, comprising: a first photographing module, a second photographing module, a shutter, a first driving mechanism, a second driving mechanism, a third driving mechanism, and a controller, and the shutter is connected to the second photographing module, driven by the first driving mechanism, the first photographing module and the second photographing module horizontally rotate synchronously; driven by the second driving mechanism, the first photographing module and the second photographing module rotate around a horizontal axis synchronously; driven by the third driving mechanism, the second photographing module independently performs horizontal movement and/or pitching rotation; the shutter, the first driving mechanism, the second driving mechanism and the third driving mechanism act respectively under the control of the controller.

Further, the first photographing module comprises a first lens and a first image sensor, the second photographing module comprises a second lens and a second image sensor, a viewing angle range of the first lens is larger than that of the second lens, and a transmittance of the second lens is larger than that of the first lens.

Further, the first driving mechanism is a horizontal 360° rotatable platform, the second driving mechanism is a fixed-axis rotatable platform, and the third driving mechanism is a three-dimensional movable means.

Further, the second photographing module further comprises a gyroscope sensor for shaking detection.

In another aspect, the present disclosure provides a photographing method using the intelligent dual-lens photographing device mentioned above, which comprises:

acquiring a target shooting object, and imaging the target shooting object on a first image sensor of a first photographing module;

obtaining a distance and direction that the target shooting object moves on the first image sensor per unit time to determine a moving speed of the object;

calculating a driving speed and direction of a first driving mechanism and a second driving mechanism, so that the first photographing module tracks the target shooting object under the driving of the first driving mechanism and the second driving mechanism;

calculating a driving speed and direction of a third driving mechanism according to the determined moving speed of the object, so that a second photographing module reaches a pre-shooting position under the driving of the third driving mechanism;

calculating an start-up time according to the pre-shooting position and the moving speed of the object;

stopping the driving of the first driving mechanism, the second driving mechanism, and the third driving mechanism, and starting timing at the same time; when the start-up time is reached, then starting a shutter.

Further, before starting the shutter, it further comprises: according to the moving speed of the object, matching and setting a shutter speed.

Further, before starting the shutter, it further comprises: according to a focal length and optical magnification of the first lens of the first photographing module and a size of the first image sensor and an imaged size of the target shooting object on the first image sensor, obtaining a distance between the object and the first lens;

according to the distance between the object and the first lens, setting a focusing focal length.

Further, before the third driving mechanism drives the second photographing module, it further comprises:

detecting whether the target shooting object is in an overlap range of viewing fields of the first lens and the second lens at the same time, if not, triggering the third driving mechanism to drive the second photographing module to move until the target shooting object enter an overlap range of viewing fields of the first lens and the second lens.

Further, triggering the third driving mechanism to drive the second photographing module to move until the target shooting object enter an overlap range of viewing fields of the first lens and the second lens comprises:

selecting a crossing point of viewing fields of the first lens and the second lens as a starting point;

selecting a current point within the viewing field of the first lens where the target shooting object is located as an end point;

taking a straight line where the starting point and the end point are located as a target adjusted optical axis;

obtaining an angle to be adjusted according to a current optical axis of the second lens and the target adjusted optical axis;

by the third driving mechanism, driving the second photographing module to rotate the angle to be adjusted in a direction close to the target adjusted optical axis.

Further, after starting the shutter, it further comprises: transmitting a shot image to a mobile terminal in a wireless or wired communication mode.

The beneficial effects brought by the above technical solutions provided in the present disclosure are as follows:
1) The dual-lens photographing device corresponds to an optical magnifying glass, which is composed of multi-stage lenses and can achieve zoom and magnification;

2) Tracking target objects is achieved through tracking motors, electronic imaging is achieved through CCD, CMOS or other image sensors, and image features can be extracted through electronic images to identify imaging objects;
3) Small size, and easy to make wearable and movable optical equipment;
4) By moving the identifying lens to the pre-shooting position and starting the shutter when the object reaches the pre-shooting position, the imaging is clear.

BRIEF DESCRIPTION

Some of the embodiments will be described in detail, with references to the following Figures, wherein like designations denote like members, wherein.

Wherein, the reference numbers are: 1—first photographing module, 2—second photographing module, 3—first driving mechanism, 4—second driving mechanism, 5—gyroscope sensor.

DETAILED DESCRIPTION

In order that the schemes of the present disclosure can be easily understood by those skilled in the art, the technical solutions in the embodiments of the present disclosure are explained clearly and fully combining with the accompanying drawings, and apparently, the described embodiments are merely a part of the embodiments of the present disclosure, not all of the embodiments. Based on the embodiments of the present disclosure, all other embodiments obtained by one of ordinary skill in the art without creative work belong to the protective scope of the present disclosure.

It should be noted that terms "first", "second" and the like in the description, the claims and the accompanying drawings of the present disclosure are used to distinguish similar objects, and do not have to be used to describe a specific order or sequence. It should be understood that the data so used can be interchanged under appropriate circumstances so that the embodiments of the present disclosure described herein can be implemented in an order other than those illustrated or described herein. In addition, the terms "comprise" and "have" and any variations thereof are intended to cover non-exclusive inclusions, for example, processes, methods, devices, products or equipment that include a series of steps or units are not necessarily limited to those clearly listed steps or units, but may include other steps or units not explicitly listed or inherent to these processes, methods, products or equipment.

Figure 1:
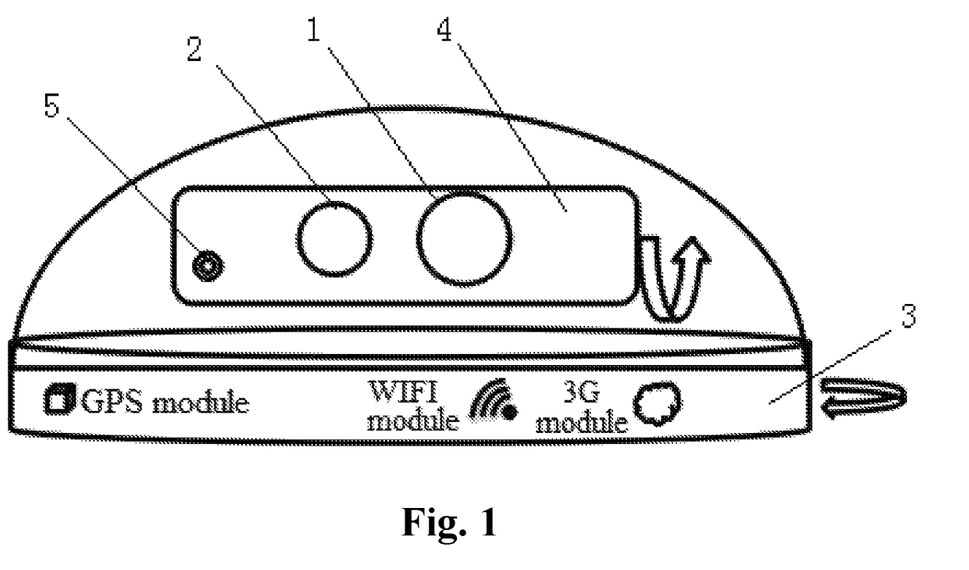
FIG. 1 is a schematic structure diagram of an intelligent dual-lens photographing device provided by an embodiment of the present disclosure.

In one embodiment of the present disclosure, an intelligent dual-lens photographing device is provided, referring to FIG. 1, it comprises: a first photographing module 1, a second photographing module 2, a shutter, a first driving mechanism 3, a second driving mechanism 4, a third driving mechanism, and a controller; the shutter is connected to the second photographing module 2, that is to say, when the shutter is started, the second photographing module 2 shoots; the first photographing module 1 comprises a first lens and a first image sensor, and the second photographing module 2 comprises a second lens and a second image sensor.

The shooting idea of the embodiment of the present disclosure is as follows: first, the characteristic of the wide viewing angle of the wide-angle lens is utilized to synchronize with a moving target shooting object and track the moving target shooting object, and then the characteristics of the high pixels and high imaging sharpness of the zoom/telephoto lens are utilized to shoot the tracked object at a waiting position, that is, pre-estimating according to the moving direction of the moving object, reaching a specified position in this direction ahead of a certain time, and then waiting for the object to move to the location and then starting the shutter. From the above, the first photographing module 1 is a wide-angle photographing module, and the first lens is a wide-angle lens; the second photographing module 2 is a zoom long-focal photographing module, and the second lens is a zoom long-focal lens. In a preferred embodiment of the present disclosure, the first image sensor and the second image sensor are CCD sensors, but the present disclosure does not limit the first image sensor and the second image sensor to the CCD type, in addition to CCD, other common image sensors such as CMOS can also implement the present disclosure. Optionally, the size and pixel parameters of the first image sensor and the second image sensor are the same, but not as a limitation of the implementation of the present disclosure. As a preferred embodiment, the viewing angle range of the first lens is greater than that of the second lens, and the light transmittance of the second lens is greater than that of the first lens; the light transmittance of the lens is an optical characteristic, and under normal circumstances, the greater the light transmittance, the clearer the image. In an embodiment of the present disclosure, the wide-angle characteristic of the first lens is highlighted to facilitate the use of the first lens to capture and track and synchronize with the target shooting object, the second lens highlights its imaging characteristics, which facilitates the use of the second lens for clear imaging of the target shooting object, and the higher the pixels and resolution of the second image sensor, the clearer the imaging of the target shooting object.

Driven by the first driving mechanism 3, the first photographing module 1 and the second photographing module 2 horizontally rotate synchronously, wherein the first driving mechanism 3 is a horizontal 360° rotatable platform as shown in FIG. 1; driven by the second driving mechanism 4, the first photographing module 1 and the second photographing module 2 rotate synchronously around a horizontal axis, wherein the second driving mechanism 4 is a fixed-axis rotatable platform; driven by the second driving mechanism 4, the first photographing module 1 and the second photographing module 2 both make a rotational movement about a horizontal axis, and can rotate around different horizontal axes respectively, in a preferred embodiment, the first photographing module 1 and the second photographing module 2 rotate around the same horizontal axis; driven by the third driving mechanism, the second photographing module 2 independently performs horizontal movement and/or pitching rotation, wherein the third driving mechanism is a three-dimensional movable means, preferably, the third driving mechanism comprises at least two driving motors, the driving motors separately drive the second photographing module 2 to rotate in different dimensionalities, for example it comprises two motors, one of which drives the second photographing module 2 to move in a two-dimensional plane, the other one drives the second photographing module 2 to roll around a fixed axis, or it comprises three motors to drive the movements of the second photographing module 2 in X/Y/Z axes respectively, and the present disclosure does not limit the specific structure of the third driving mechanism, as long as it can drive the movement of the second photographing module 2 in the three-dimensional space, the technical solution of the present disclosure can be realized; the shutter, the first driving mechanism 3, the second driving mechanism 4 and the third driving mechanism all operate respectively under the control of the controller, in the embodiment of the present disclosure, the shutter is an electronic shutter, and is electronically triggered according to a signal command issued by the controller.

To achieve anti-shake photographing, preferably, as shown in FIG. 1, the second photographing module 2 further comprises a gyroscope sensor 5 for shaking detection, using the gyroscope sensor product, the motion tendency of the second photographing module can be detected to compensate for the vibration amplitude when the mobile phone is photographing, and finally to achieve anti-shake and improve the quality of the image to be captured.

As another embodiment, on basis of the above embodiment, the intelligent dual-lens photographing device further comprises a wireless communication module, for sending shot images to a mobile terminal in a wireless communication manner, specifically, the wireless communication module comprises a WIFI module and/or a 3G module.

Figure 2:
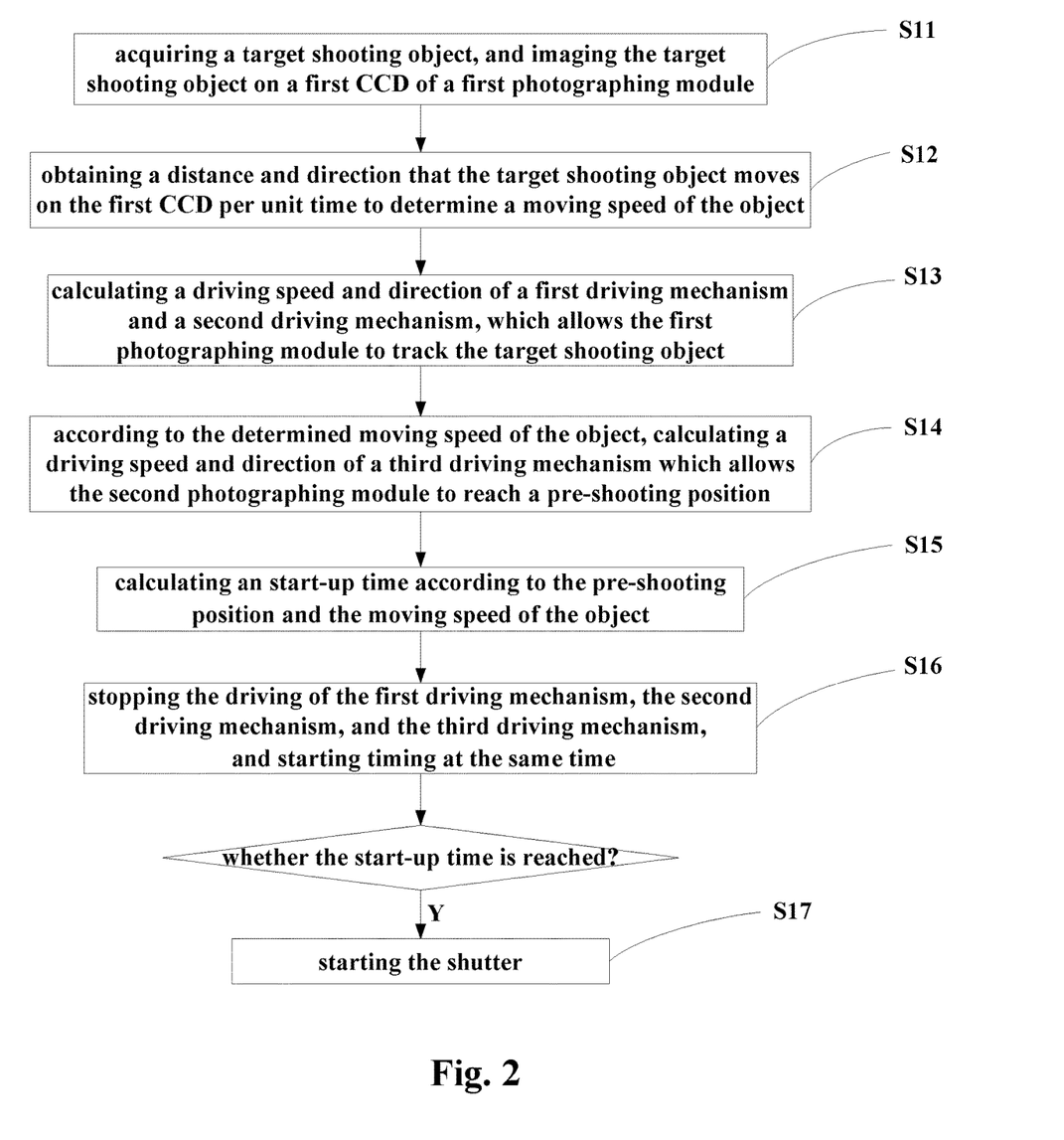
FIG. 2 is a flow chart of a photographing method using the intelligent dual-lens photographing device provided by an embodiment of the present disclosure.

In one embodiment of the present disclosure, a photographing method using above intelligent dual-lens photographing device is provided, as shown in FIG. 2, the method comprises the following steps:

S11: acquiring a target shooting object, and imaging the target shooting object on the first image sensor of the first photographing module.

Specifically, when an object enters the viewing angle range of the first lens of the first photographing module autonomously, or the first photographing module captures the object entering the lens during the rotation, it is called acquiring a target shooting object. In the embodiments of the present disclosure, on account of photographing a moving object, it is necessary to confirm whether the object is moving before determining that the target shooting object is acquired.

S12: obtaining a distance and direction that the target shooting object moves on the first image sensor per unit time to determine a moving speed of the object.

The moving speed of the object determined in S12 is a relative speed of the object, not the absolute speed. And if the absolute speed of the object is to be determined, it needs to obtain a distance between the object and the first image sensor, so as to calculate the absolute speed of the target shooting object. Since S12 is prepared for the following steps here, and the driving of the first photographing module and the second photographing module described below can refer to the relative speed of the object, therefore, it can only obtain the relative speed in S12, and it is obvious that obtaining the absolute speed can also provide reference and data basis to the first driving mechanism, the second driving mechanism and the third driving mechanism.

S13: calculating a driving speed and direction of the first driving mechanism and the second driving mechanism, so that the first photographing module tracks the target shooting object under the driving of the first driving mechanism and the second driving mechanism.

Specifically, according to the above moving speed of the object, i.e., the moving direction and speed of the target shooting object on the first image sensor, the driving speeds and directions of the first driving mechanism and the second driving mechanism are calculated; in principle, they can coincide with the moving direction and speed of the target shooting object on the first image sensor in real time, to achieve the synchronous tracking of the target shooting object by the first photographing module.

S14: calculating a driving speed and direction of the third driving mechanism according to the determined moving speed of the object, so that the second photographing module reaches a pre-shooting position under the driving of the third driving mechanism.

Specifically, after the synchronous tracking is achieved, the flight path of the target shooting object is pre-estimated, and the pre-estimated result is the position of the target shooting object after a certain time period, which is determined to be the pre-shooting position, and then the third driving mechanism drives the second photographing module to get to the pre-shooting position. In addition, the first driving mechanism and the second driving mechanism also drive the first photographing module (the second photographing module) to track and synchronize with the target shooting object, and thus, it can be seen that the third driving mechanism reaches the pre-shooting position in advance under the premise of the synchronous tracking of the second photographing module, that is to say, when performing S14, keep on performing S13.

S15: calculating an start-up time according to the pre-shooting position and the moving speed of the object.

Specifically, the time experienced from the current position to the pre-shooting position at the moving speed of the object is calculated as the start-up time of the shutter.

And, in the present disclosure, the order of execution of S14 and S15 is not limited, and except for the above order of execution, the order can also be first determining the pre-shooting position, calculating the start-up time, and then driving the second photographing module to the pre-set position.

S16: stopping the driving of the first driving mechanism, the second driving mechanism, and the third driving mechanism, and starting timing at the same time, and when the start-up time is reached, then performing S17.

S17: starting the shutter.

Specifically, after the second photographing module reaches the pre-shooting position, stop these three driving mechanisms, that is, the first photographing module and the second photographing module both remain stationary, and the timing is started, and the shutter is started at the moment the start-up time is reached, ideally, when the start-up time is reached, the target shooting object reaches the pre-shooting position, preferably, before performing S14, pre-calling the action of the third driving mechanism to drive the second photographing module to rotate until the target shooting object is located in the center of the second lens, and then when the shutter is started, the target shooting object is located in the center of the second lens of the second photographing module.

Figure 3:
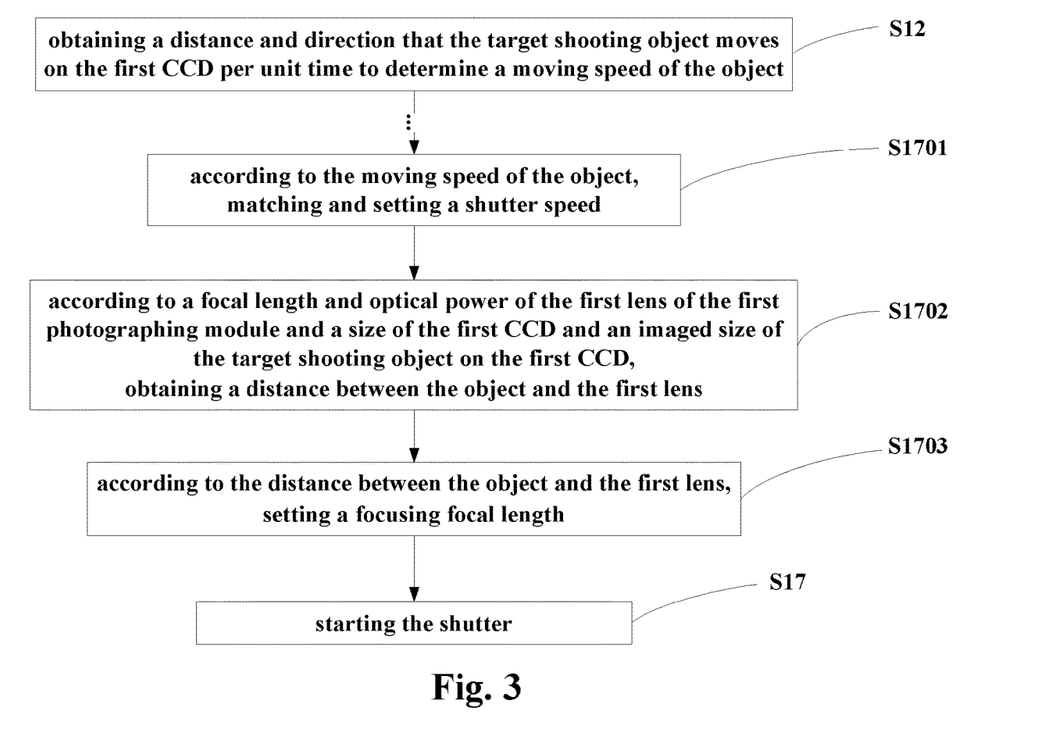
FIG. 3 is a flow chart of a configuring method for a first execution sequence of the shutter and the focal lengths provided by an embodiment of the present disclosure.

Referring to FIG. 3, before S17, it further comprises:

S1701: according to the moving speed of the object, matching and setting a shutter speed. Specifically, the present disclosure presets shutter setting rules for the intelligent photographing device to form a moving speed-shutter speed mapping table, and by querying the moving speed-shutter speed mapping table, the corresponding shutter speed can be matched.

S1702: according to a focal length and optical magnification of the first lens of the first photographing module and a size of the first image sensor and an imaged size of the target shooting object on the first image sensor, obtaining a distance between the object and the first lens.

S1703: according to the distance between the object and the first lens, setting a focusing focal length.

Specifically, the calculating of the distance between the object and the first lens is an existing optical measurement technique, which will not be repeated here. Specifically, the present disclosure presets focusing focal length setting rules for the intelligent photographing device to form a distance-focusing mapping table, and by querying the distance-focusing mapping table, and after obtaining the distance between the object and the first lens, the corresponding focusing focal length can be matched.

Combining S1701-S1703, that is, setting the shutter speed and focusing focal length during the execution of S14 to S16, so that when the shutter is started, the target shooting object is immediately photographed at the set shutter speed and focusing focal length, for best image acquisition results.

Figure 4:
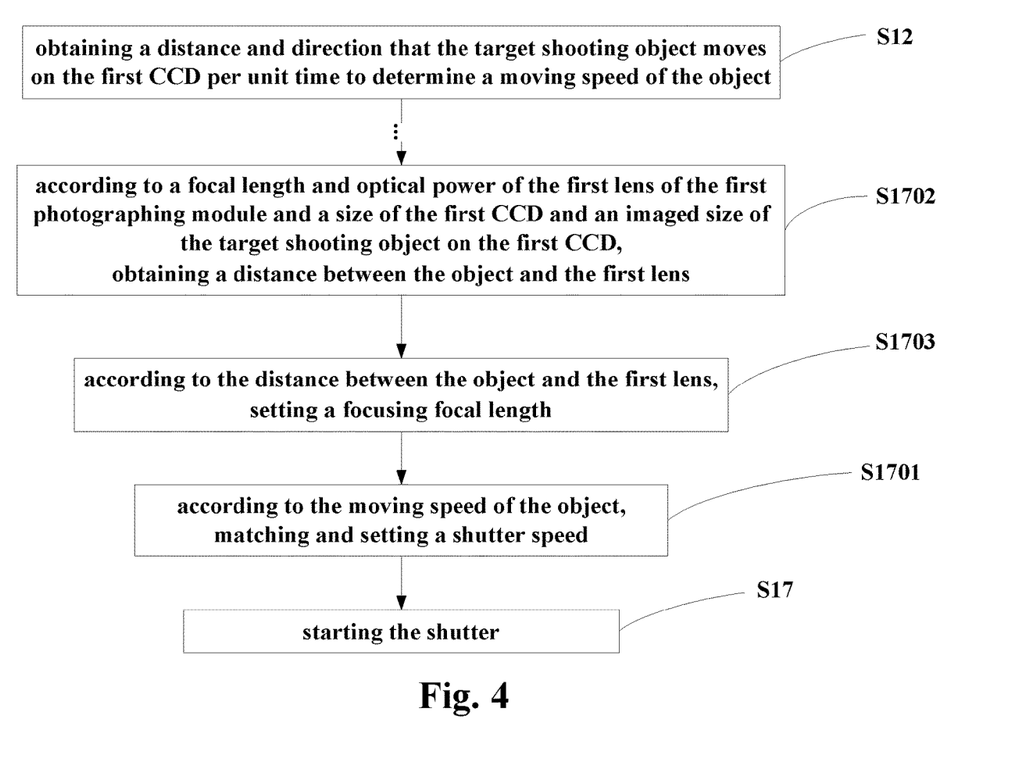
FIG. 4 is a flow chart of a configuring method for a second execution sequence of the shutter and the focal lengths provided by an embodiment of the present disclosure.

In the present disclosure, the order of execution of S1701, S1702 and S1703 is not limited, and except for the order of execution shown in FIG. 3, the order can also refer to the order of execution shown in FIG. 4, which will not be repeated here.

In order to ensure that the second photographing module can photograph the target shooting object, before the third driving mechanism drives the second photographing module, it further comprises:

detecting whether the target shooting object is in an overlap range of viewing fields of the first lens and the second lens at the same time, if not, triggering the third driving mechanism to drive the second photographing module to move until the target shooting object enter an overlap range of viewing fields of the first lens and the second lens; if yes, then keeping on performing S14-S17.

Figure 5:
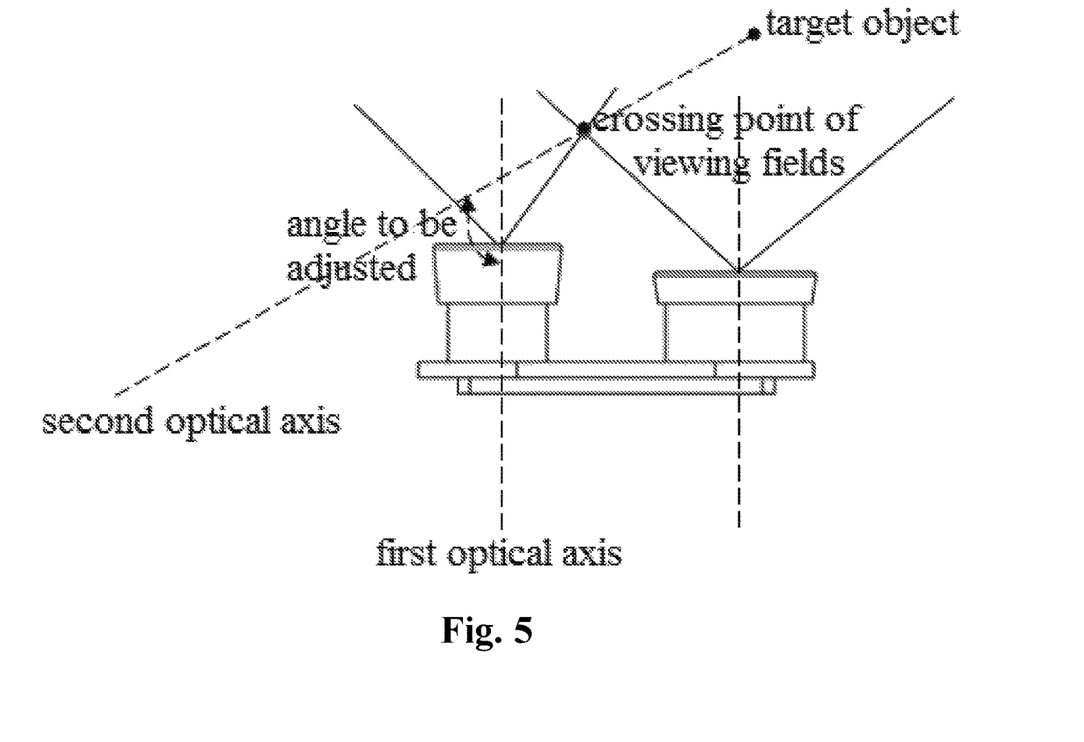
FIG. 5 is a schematic diagram of an adjustment of a second lens provided by an embodiment of the present disclosure.
Figure 6:
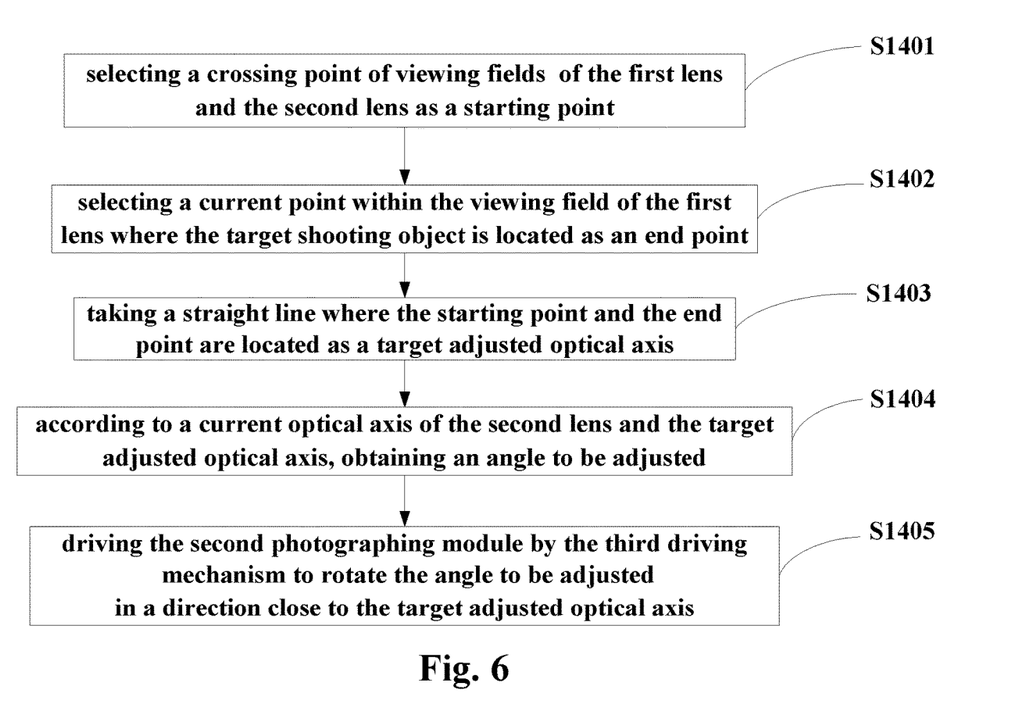
FIG. 6 is a flow chart of an adjusting method for the second lens provided by an embodiment of the present disclosure.

As shown in FIG. 5, if the target shooting object is not in an overlap range of viewing fields of the first lens and the second lens at the same time, the second lens is adjusted according to the following method, the flow chart of the method is as shown in FIG. 6:

S1401: selecting a crossing point of viewing fields of the first lens and the second lens as a starting point;

S1402: selecting a current point within the viewing field of the first lens where the target shooting object is located as an end point;

S1403: taking a straight line where the starting point and the end point are located as a target adjusted optical axis;

S1404: according to a current optical axis of the second lens and the target adjusted optical axis, obtaining an angle to be adjusted, i.e., the angle between the first optical axis and the second optical axis shown in FIG. 5;

S1405: driving the second photographing module by the third driving mechanism to rotate the angle to be adjusted in a direction close to the target adjusted optical axis, that is to say, the target shooting object can enter the rotated second lens of the second photographing module.

In another embodiment of the present disclosure, after starting the shutter, it further comprises:

transmitting a shot image to a mobile terminal in a wireless or wired communication mode, the wireless communication mode comprises a WIFI communication mode or a 3G, 4G or 5G communication mode. The present disclosure does not limit the mode of sending the image to the mobile terminal, the wireless communication method is only a preferred mode here, and the image information can also be transmitted by wired communication.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. An intelligent dual-lens photographing device, comprising:
   a first photographing module;
   a second photographing module;
   a shutter;
   a first driving mechanism;
   a second driving mechanism;
   a third driving mechanism; and
   a controller;
   wherein the shutter is connected to the second photographing module;
   wherein, driven by the first driving mechanism, the first photographing module and the second photographing module horizontally rotate synchronously;
   wherein, driven by the second driving mechanism, the first photographing module and the second photographing module rotate around a horizontal axis synchronously;
   wherein, driven by the third driving mechanism, the second photographing module independently performs horizontal movement and/or pitching rotation;
   wherein the shutter, the first driving mechanism, the second driving mechanism and the third driving mechanism act respectively under a control of the controller;
   wherein the intelligent dual-lens photographing device is configured to:
   acquire a target shooting object, and image the target shooting object on a first image sensor of a first photographing module;
   obtain a distance and direction that the target shooting object moves on the first image sensor per unit time to determine a moving speed of the object;
   calculate a driving speed and a direction of a first driving mechanism and a second driving mechanism, which allows the first photographing module to track the target shooting object under the driving of the first driving mechanism and the second driving mechanism;
   calculate a driving speed and a direction of a third driving mechanism according to the moving speed of the object, which allows the second photographing module to reach a pre-shooting position under the driving of the third driving mechanism;
   calculate an start-up time according to the pre-shooting position and the moving speed of the object; and
   stop the driving of the first driving mechanism, the second driving mechanism, and the third driving mechanism, and starting timing at a same time, and subsequently starting the shutter when the start-up time is reached.

2. The photographing device according to claim 1, wherein the first photographing module comprises a first lens and a first image sensor, the second photographing module comprises a second lens and a second image sensor, further wherein a viewing angle range of the first lens is larger than that of the second lens, and a transmittance of the second lens is larger than that of the first lens.

3. The photographing device according to claim 1, wherein the first driving mechanism is a horizontal 360° rotatable platform, the second driving mechanism is a fixed-axis rotatable platform, and the third driving mechanism is a three-dimensional movable means.

4. The photographing device according to claim 1, wherein the second photographing module further comprises a gyroscope sensor for shaking detection.

5. A photographing method using an intelligent dual-lens photographing device, wherein the intelligent dual-lens photographing device comprises a first photographing module, a second photographing module, a shutter, a first driving mechanism, a second driving mechanism, a third driving mechanism, and a controller, wherein the shutter is connected to the second photographing module, wherein, driven by the first driving mechanism, the first photographing module and the second photographing module horizontally rotate synchronously, wherein, driven by the second driving mechanism, the first photographing module and the second photographing module rotate around a horizontal axis synchronously, wherein, driven by the third driving mechanism, the second photographing module independently performs horizontal movement and/or pitching rotation, wherein the shutter, the first driving mechanism, the second driving mechanism and the third driving mechanism act respectively under control of the controller, the photographing method comprising:
    acquiring a target shooting object, and imaging the target shooting object on a first image sensor of a first photographing module;
    obtaining a distance and direction that the target shooting object moves on the first image sensor per unit time to determine a moving speed of the object;
    calculating a driving speed and a direction of a first driving mechanism and a second driving mechanism, which allows the first photographing module to track the target shooting object under the driving of the first driving mechanism and the second driving mechanism;
    calculating a driving speed and a direction of a third driving mechanism according to the moving speed of the object, which allows the second photographing module to reach a pre-shooting position under the driving of the third driving mechanism;
    calculating an start-up time according to the pre-shooting position and the moving speed of the object; and
    stopping the driving of the first driving mechanism, the second driving mechanism, and the third driving mechanism, and starting timing at a same time, and subsequently starting the shutter when the start-up time is reached.

6. The photographing method according to claim 5, wherein before starting the shutter, matching and setting a shutter speed according to the moving speed of the object.

7. The photographing method according to claim 5, wherein before starting the shutter:
    obtaining a distance between the object and the first lens according to a focal length and optical magnification of the first lens of the first photographing module, a size of the first image sensor and an imaged size of the target shooting object on the first image sensor; and
    setting a focusing focal length according to the distance between the object and the first lens.

8. The photographing method according to claim 5, wherein before the third driving mechanism drives the second photographing module:
    detecting whether the target shooting object is in an overlap range of viewing fields of the first lens and the second lens at the same time, if not, triggering the third driving mechanism to drive the second photographing module to move until the target shooting object enter an overlap range of viewing fields of the first lens and the second lens.

9. The photographing method according to claim 8, wherein triggering the third driving mechanism to drive the second photographing module to move until the target shooting object enter an overlap range of viewing fields of the first lens and the second lens comprises:
    selecting a crossing point of viewing fields of the first lens and the second lens as a starting point;
    selecting a current point within the viewing field of the first lens where the target shooting object is located as an end point;
    taking a straight line where the starting point and the end point are located as a target adjusted optical axis;
    obtaining an angle to be adjusted according to a current optical axis of the second lens and the target adjusted optical axis; and
    by the third driving mechanism, driving the second photographing module to rotate the angle to be adjusted in a direction close to the target adjusted optical axis.

10. The photographing method according to claim 5, wherein after starting the shutter:
    transmitting a shot image to a mobile terminal in a wireless or wired communication mode.

11. The photographing method according to claim 5, wherein the first photographing module comprises a first lens and a first image sensor, the second photographing module comprises a second lens and a second image sensor, further; wherein a viewing angle range of the first lens is larger than that of the second lens, and a transmittance of the second lens is larger than that of the first lens.

12. The photographing method according to claim 5, wherein the first driving mechanism is a horizontal 360° rotatable platform, the second driving mechanism is a fixed-axis rotatable platform, and the third driving mechanism is a three-dimensional movable means.

13. The photographing method according to claim 5, wherein the second photographing module further comprises a gyroscope sensor for shaking detection.

* * * * *